United States Patent Office 2,705,721
Patented Apr. 5, 1955

2,705,721

$\Delta^{5(10)}$-ESTRAENE-3,17-DIOL AND ESTERS THEREOF

Leonard N. Nysted, Highland Park, Ill., assignor to G. D. Searle & Co., Chicago, Ill., a corporation of Illinois No Drawing. Application April 14, 1954,
Serial No. 423,227

3 Claims. (Cl. 260—397.5)

The present invention relates to new and valuable steroids and, more specifically, to 1,2,3,4,6,7,8,9,11,12,13, 14,16,17 - tetradecahydro - 15H - cyclopenta[a]phenanthrene-3,17-diol and its carboxylic acid esters and to their preparation. The compounds which constitute my invention can be represented by the general structural formula

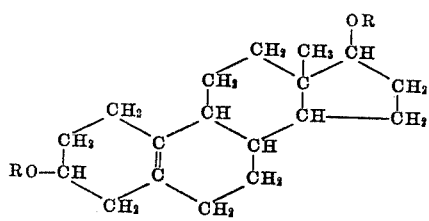

wherein R is a member of the class consisting of hydrogen and acyl radicals derived from hydrocarbon carboxylic acids preferably containing less than 9 carbon atoms. Representative acyloxy radicals which RO can represent are formyloxy, acetoxy, propionoxy, butyroxy, valeroxy, hexanoyloxy, heptanoyloxy, octanoyloxy, benzoyloxy, phenylacetoxy, toluoyloxy, cyclohexylformyloxy, β-cyclopentylpropionoxy, and those derived from maleic, succinic, glutaric, and adipic acids, and the like.

It is an object of my invention to provide pharmacologically valuable compounds. It is a special object of my invention to provide active anabolic and androgenic agents. It is a further object of my invention to provide compounds which are useful as intermediates in the synthesis of other pharmacologically active steroids. Additional objects of my invention will be apparent to those skilled in the art from a reading of the following.

For the synthesis of 1,2,3,4,6,7,8,9,11,12,13,14,16,17-tetradecahydro - 15H - cyclopenta[a]phenanthrene - 3,17-diol, I prefer to subject 3-oxo-1,2,3,4,6,7,8,9,11,12,13, 14,16,17 - tetradecahydro - 15H - cyclopenta[a]phenanthrene-17-ol to the reducing action of an alkali metal borohydride or alkali metal aluminum hydride, the preferred alkali metals being lithium and sodium. Monoas well as diesterification is accomplished by the use of the corresponding proportions of anhydrides, chlorides, or ketenes of the corresponding acids. If one equivalent or less of the acyl halide, anhydride or ketene is used in the procedures described in the examples below, monoesterification in the 3-position predominates greatly. Mixed esters of the general formula

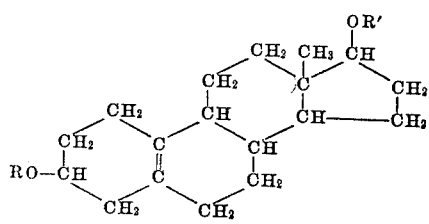

wherein R and R' are different acyl radicals, are prepared by treatment of 1,2,3,4,6,7,8,9,11,12,13,14,16,17-tetradecahydro - 15H - cyclopenta[a]phenanthrene-3,17-diol with one equivalent of RCOCl or (R₂CO)₂O, isolation of the 3-acyloxy derivative and further esterification with a compound of the type R'COCl or (R'CO)₂O.

In the following examples quantities are indicated in parts by weight. These examples are provided for the purpose of illustration only and are in no way to be construed as limiting the invention in spirit or in scope.

Example 1

To refluxing solution of 45 parts of 3-methoxy-$\Delta^{2,5(10)}$-estradien-17β-ol in 600 parts of absolute methanol are added 50 parts of glacial acetic acid. Refluxing is continued for 10 minutes after which 750 parts of hot water are added. The reaction mixture is maintained at 0° C. until the 3-oxo-$\Delta^{5(10)}$-estraen-17β-ol precipitates. On recrystallization from a mixture of acetone and petroleum ether it melts at about 174–176° C.

A solution of 33 parts of the 3-oxo-$\Delta^{5(10)}$-estraen-17β-ol in 700 parts of dioxane and 700 parts of ether is added to a solution of 50 parts of lithium aluminum hydride in 3500 parts of ether. The reaction mixture is stirred at reflux temperature for 5 hours and then at room temperature for 10 hours. It is then treated with 200 parts of ethyl acetate. Stirring is continued for another hour after which the reaction is poured into 1200 parts of concentrated hydrochloric acid and 5000 parts of ice. The etheric layer is washed with dilute hydrochloric acid, sodium bicarbonate, and water and finally freed from solvent by vacuum distillation. The residue is recrystallized from a mixture of acetone and petroleum ether. The 1,2,3,4,6,7,8,9,11,12,13,14,16,17-tetradecahydro - 15H - cyclopenta[a]phenanthrene-3,17-diol thus obtained melts at about 206–208° C. Its optical rotation in a 1% chloroform solution is $$[\alpha]_D = +184°$$

Example 2

A mixture of 39 parts of 1,2,3,4,6,7,8,9,11,12,13,14, 16,17 - tetradecahydro - 15H - cyclopenta[a]phenanthrene-3,17-diol, 330 parts of acetic anhydride and 300 parts of pyridine is stirred until solution occurs. The reaction mixture is heated at 70° C. for 30 minutes, 5000 parts of ice are added and, after one hour, the crystalline precipitate is collected on a filter. Recrystallized from methanol and water, 1,2,3,4,6,7,8,9,11,12,13,14,16,17-tetradecahydro - 15H - cyclopenta[a]phenanthrene-3,17-diol melts at about 118–119° C. The optical rotation of a 1% chloroform solution is $[\alpha]_D = +129°$. The infrared absorption spectrum shows pronounced maxima at 5.79 and 8.0 microns.

Example 3

A mixture of 2 parts of 1,2,3,4,6,7,8,9,11,12,13,14,16, 17-tetradecahydro - 15H - cyclopenta[a]phenanthrene-3,17-diol, 21 parts of propionic anhydride and 15 parts of pyridine is heated for an hour at 75° C. and then treated with ice. Isolation by the method of the preceding example yields 3,17-dipropionyloxy-1,2,3,4,6,7, 8,9,11,12,13,14,16,17 - tetradecahydro - 15H - cyclopenta[a]phenanthrene.

Example 4

A solution of 2 parts of 1,2,3,4,6,7,8,9,11,12,13,14,16, 17 - tetradecahydro - 15H - cyclopenta[a]phenanthrene-3,17-diol in 60 parts of benzene is mixed with 4 parts of anhydrous freshly distilled pyridine and 4 parts of freshly distilled benzoyl chloride and maintained at 25° C. for 24 hours. The reaction mixture is then diluted with 350 parts of ether, washed successively with water, aqueous sodium bicarbonate solution and again with water, dried over anhydrous sodium sulfate, filtered and evaporated under vacuum. The residue is recrystallized from a mixture of acetone and petroleum ether to yield 3,17-dibenzoyloxy - 1,2,3,4,6,7,8,9,11,12,13,14,16,17 - tetradecahydro-15H-cyclopenta[a]phenanthrene.

Example 5

For the 4 parts of benzoyl chloride used in the preceding example there are substituted 5 parts of β-cyclopentylpropionyl chloride. There is thus obtained 3,17-di(β - cyclopentylpropionyloxy) - 1,2,3,4,6,7,8,9,11,12, 13,14,16,17 - tetradecahydro - 15H - cyclopenta[a]-phenanthrene.

Example 6

A solution of 55 parts of 1,2,3,4,6,7,8,9,11,12,13,14,16,17 - tetradecahydro - 15H - cyclopenta[a]phenanthrene-3,17-diol in 165 parts of benzene is mixed with 28 parts of benzoyl chloride and heated at 30° C. for 12 hours. The reaction mixture is worked up as in Example 4. The 3-benzoyloxy-1,2,3,4,6,7,8,9,11,12,13,14,16,17 - tetradecahydro - 15H - cyclopenta[a]-phenanthrene-17-ol can be further purified by chromatography on silica gel. 48 parts of this product, 100 parts of acetic anhydride and 500 parts of pyridine are stirred at 70° C. for 30 minutes and the reaction mixture is worked up by the method of Example 2. There is thus obtained 3-benzoyloxy-17-acetoxy-1,2,3,4,6,7,8,9,11,12,13,14,16,17 - tetradecahydro - 15H - cyclopenta[a]phenanthrene.

I claim:

1. A member of the class consisting of 1,2,3,4,6,7,8,9,11,12,13,14,16,17 - tetradecahydro - 15H - cyclopenta[a]phenanthrene-3,17-diol and 1,2,3,4,6,7,8,9,11,12,13,14,16,17 - tetradecahydro - 15H - cyclopenta[a]phenanthrene-3,17-diol esters of hydrocarbon carboxylic acids containing less than 9 carbon atoms.

2. 1,2,3,4,6,7,8,9,11,12,13,14,16,17 - tetradecahydro-15H-cyclopenta[a]phenanthrene-3,17-diol.

3. 3,17 - diacetoxy - 1,2,3,4,6,7,8,9,11,12,13,14,16,17-tetradecahydro-15H-cyclopenta[a]phenanthrene.

References Cited in the file of this patent

UNITED STATES PATENTS 2,655,518   Colton _____ Oct. 13, 1953

OTHER REFERENCES

Birch et al.: Jour. Chem. Soc. 1949, 2531–2536; 1950, 367–368.